(12) United States Patent
Kim

(10) Patent No.: US 8,885,896 B2
(45) Date of Patent: Nov. 11, 2014

(54) MULTIPLE CHARGE-COUPLED BIOMETRIC SENSOR ARRAY

(71) Applicant: Moon J. Kim, Palo Alto, CA (US)

(72) Inventor: Moon J. Kim, Palo Alto, CA (US)

( * ) Notice: Subject to any disclaimer, the term of this patent is extended or adjusted under 35 U.S.C. 154(b) by 0 days.

(21) Appl. No.: 14/215,314

(22) Filed: Mar. 17, 2014

(65) Prior Publication Data

US 2014/0286547 A1 Sep. 25, 2014

Related U.S. Application Data

(63) Continuation of application No. 13/159,504, filed on Jun. 14, 2011, now Pat. No. 8,675,928.

(51) Int. Cl.
*G06K 9/00* (2006.01)
*G07C 9/00* (2006.01)

(52) U.S. Cl.
CPC ............. *G06K 9/0002* (2013.01); *G06K 9/00* (2013.01); *G07C 9/00071* (2013.01)
USPC .......................................... 382/124; 382/125

(58) Field of Classification Search
None
See application file for complete search history.

(56) References Cited

U.S. PATENT DOCUMENTS

| | | | |
|---|---|---|---|
| 4,429,413 A | 1/1984 | Edwards | |
| 5,864,296 A | 1/1999 | Upton | |
| 5,907,627 A | 5/1999 | Borza | |
| 5,940,525 A | 8/1999 | Itsumi | |
| 6,097,035 A | 8/2000 | Belongie et al. | |
| 6,114,862 A | 9/2000 | Tartagni et al. | |
| 6,125,192 A | 9/2000 | Bjorn et al. | |
| 6,161,157 A | 12/2000 | Tripathi et al. | |
| 6,317,508 B1 | 11/2001 | Kramer et al. | |
| 6,360,953 B1 | 3/2002 | Lin et al. | |
| 6,414,297 B1 | 7/2002 | Sasaki et al. | |

(Continued)

FOREIGN PATENT DOCUMENTS

KR 10-2005-0025690 A 3/2005

OTHER PUBLICATIONS

CardPOS Europe Blog, "Fast TCP/IP Fingerpring Reader", Feb. 18, 2011, No Author Cited, 1 page.

(Continued)

*Primary Examiner* — Anand Bhatnagar
*Assistant Examiner* — Soo Park
(74) *Attorney, Agent, or Firm* — Maxine L. Barasch; Keohane & D'Alessandro PLLC

(57) ABSTRACT

Embodiments of the present invention relate to fingerprint scanning. Specifically, the present invention relates to a multi-sided fingerprint scanning device on a card (e.g., credit card, smart card, etc.), an associated energy-efficient method for attaining accurate fingerprint information using a multiple charge-coupled biometric sensor array. In a typical embodiment, a scanning device will be provided that includes a scanning area comprised of a set (e.g., at least one) of imaging pixel electrodes (e.g., arranged adjacent to one another in a grid-like or other fashion). As a user presses his/her finger against the scanning area, a portion of the finger will contact a plurality of electrodes. When this occurs, a voltage source of the device will apply a first voltage to each of the plurality of electrodes. A meter of the device will take a first electrical measurement (e.g., resistance and/or charged skin voltage) of the plurality of electrodes. The voltage source of the device will apply a second voltage to the plurality of electrodes. The meter of the device will take a second electrical measurement (e.g., resistance and/or charged skin voltage) of the plurality of electrodes. The voltage level difference between the first electrical measurement and second electrical measurement is calculated. The voltage level difference provides accurate fingerprint information.

20 Claims, 9 Drawing Sheets

(56) References Cited

U.S. PATENT DOCUMENTS

| | | |
|---|---|---|
| 6,512,381 B2 | 1/2003 | Kramer |
| 6,580,816 B2 | 6/2003 | Kramer et al. |
| 6,633,656 B1 | 10/2003 | Picard |
| 6,643,389 B1 | 11/2003 | Raynal et al. |
| 6,681,992 B2 | 1/2004 | Iihama |
| 6,686,546 B2 | 2/2004 | Chiu |
| 6,741,729 B2 | 5/2004 | Bjorn et al. |
| 7,231,070 B2 | 6/2007 | Bjorn et al. |
| 7,519,204 B2 | 4/2009 | Bjorn et al. |
| 7,864,992 B2 | 1/2011 | Riedijk et al. |
| 7,961,917 B2 | 6/2011 | Black |
| 8,031,046 B2 | 10/2011 | Franza et al. |
| 8,144,115 B2 | 3/2012 | Konicek |
| 8,392,965 B2 | 3/2013 | Carter et al. |
| 2002/0064892 A1 | 5/2002 | Lepert et al. |
| 2005/0163350 A1 | 7/2005 | Kim et al. |
| 2005/0204091 A1 | 9/2005 | Kilbuck et al. |
| 2005/0226478 A1 | 10/2005 | Fujiyoshi |
| 2006/0171230 A1 | 8/2006 | Bacchus et al. |
| 2008/0201661 A1 | 8/2008 | Haynes et al. |
| 2009/0055580 A1 | 2/2009 | Moscibroda et al. |
| 2009/0058598 A1 | 3/2009 | Sanchez Sanchez et al. |
| 2009/0150641 A1 | 6/2009 | Flynn et al. |
| 2009/0157993 A1 | 6/2009 | Garrett, Jr. |
| 2010/0113952 A1 | 5/2010 | Raguin et al. |

OTHER PUBLICATIONS

Insight Spotlight, "Lights and stripes and the future of fingerprinting", Flashscan 3D, LLC, 2010, No Author Cited, 2 pages.

Soo Jin Park, USPTO Notice of Allowance and Fee(s) Due, U.S. Appl. No. 13/159,504, Date Mailed Oct. 28, 2013, 28 pages.

Han V. Doan, USPTO Office Action, U.S. Appl. No. 13/316,782, Notification Date Mar. 29, 2013, 17 pages.

Han V. Doan, USPTO Final Office Action, U.S. Appl. No. 13/316,782, Notification Date Oct. 23, 2013, 15 pages.

Soo Jin Park, USPTO Office Action, U.S. Appl. No. 13/106,928, Notification Date Jul. 17, 2013, 21 pages.

Soo Jin Park, USPTO Notice of Allowance and Fee(s) Due, U.S. Appl. No. 13/106,928, Date Mailed Dec. 6, 2013, 15 pages.

MULTIPLE CHARGE-COUPLED BIOMETRIC SENSOR ARRAY

CROSS-REFERENCE TO RELATED APPLICATIONS

The present invention is a continuation of, and claims the benefit of, co-pending application Ser. No. 13/159,504, entitled MULTIPLE CHARGE-COUPLED BIOMETRIC SENSOR ARRAY, filed Jun. 14, 2011, the entire contents of which are herein incorporated by reference. The present invention is related in some aspects to commonly owned, and co-pending application Ser. No. 13/096,179, entitled "ADAPTIVE FINGERPRINT SCANNING", filed Apr. 28, 2011, the entire contents of which are herein incorporated by reference. The present invention is also related in some aspects to commonly owned, and co-pending application Ser. No. 13/106,928, entitled "MULTI-SIDED CARD HAVING A RESISTIVE FINGERPRINT IMAGING ARRAY", filed May 13, 2011, the entire contents of which are herein incorporated by reference.

FIELD OF THE INVENTION

In general, the present invention relates to fingerprint scanning. Specifically, the present invention relates to a multi-sided fingerprint scanning device on a card (e.g., credit card, smart card, etc.), an associated energy-efficient method for attaining accurate fingerprint information using a multiple charge-coupled biometric sensor array.

BACKGROUND OF THE INVENTION

As global security concerns continue to grow, fingerprint scanning for identity verification is becoming an often used tool for identity verification. Existing fingerprint imaging methods are energy inefficient and require careful calibration. Heretofore, several unsuccessful attempts have been made to address these shortcomings.

U.S. Pat. Nos. 7,519,204, 7,231,078, 6,741,729, 6,125,192, and 6,097,035 disclose a method and apparatus for fingerprint recognition.

U.S. Pat. No. 6,512,381 discloses a fingerprint sensing circuit.

U.S. Pat. No. 5,864,296 discloses a fingerprint ridge, sensor-based detector.

U.S. Pat. No. 7,864,992 discloses a fingerprint sensor element that measures sensor point capacitance.

U.S. Pat. Nos. 6,643,389, 6,580,816, and 6,317,508 disclose a capacitive semiconductor array for fingerprint detection.

U.S. Pat. No. 6,633,656 discloses a fingerprint sensor comprised of an array of microthermistor devices which convert temperature conditions into electrical signals.

U.S. Pat. No. 6,414,297 discloses a fingerprint reading apparatus.

U.S. Pat. No. 4,429,413 discloses a fingerprint sensor for creating an electrical output signal based upon the topological pattern of a finger.

U.S. Patent Application 20050226478 discloses a fingerprint sensor that uses a capacitance detecting circuit.

U.S. Patent Application 20050163350 discloses a fingerprint sensing apparatus.

None of these references, however, teach an energy efficient way to provide accurate fingerprint information without time-consuming calibration.

SUMMARY OF THE INVENTION

In general, the embodiments of the present invention relate to fingerprint scanning. Specifically, the present invention relates to a multi-sided fingerprint scanning device on a card (e.g., credit card, smart card, etc.), an associated energy-efficient method for attaining accurate fingerprint information using a multiple charge-coupled biometric sensor array. In a typical embodiment, a scanning device will be provided that includes a scanning area comprised of a set (e.g., at least one) of imaging pixel electrodes (e.g., arranged adjacent to one another in a grid-like or other fashion). As a user presses his/her finger against the scanning area, a portion of the finger will contact a plurality of electrodes. When this occurs, a voltage source of the device will apply a first voltage to each of the plurality of electrodes. A meter of the device will take a first electrical measurement (e.g., resistance and/or charged skin voltage) of the plurality of electrodes. The voltage source of the device will apply a second voltage to the plurality of electrodes. The meter of the device will take a second electrical measurement (e.g., resistance and/or charged skin voltage) of the plurality of electrodes. The voltage level difference between the first electrical measurement and second electrical measurement is calculated. The voltage level difference provides accurate fingerprint information. This technology can be incorporated into a card (e.g., a credit card, debit card, smart card, etc.) for fraud prevention purposes.

A first aspect of the present invention provides a multi-sided card having a resistive fingerprint array, comprising: a first side having a first fingerprint scanning device; a second side having a second fingerprint scanning device, the first fingerprint scanning device and the second fingerprint scanning device each comprising: a set of imaging pixel electrodes for creating a fingerprint scanning surface; a voltage source coupled to the set of imaging pixel electrodes for supplying a first voltage to a plurality of imaging pixel electrodes for a controlled duration and supplying a second voltage to the plurality of imaging pixel electrodes for a controlled duration; a meter coupled to the set of imaging pixel electrodes for taking a first electrical measurement relating to the first voltage for the plurality of imaging pixel electrodes and taking a second electrical measurement relating to the second voltage for the plurality of imaging pixel electrodes; and a controller coupled to the meter for calculating the voltage level difference between the first and second electrical measurements.

A second aspect of the present invention provides a method of scanning fingerprints on a multi-sided card, comprising: applying a first voltage to a first imaging pixel electrode, the first imaging pixel electrode being in contact with a finger positioned on the multi-sided card; determining a first electrical measurement across the first imaging pixel electrode; applying a second voltage to a second imaging pixel electrode, the second imaging pixel electrode being in contact with the finger positioned on the multi-sided card; determining a second electrical measurement across the second imaging pixel electrode; and calculating the voltage level difference between the first and second electrical measurements.

A third aspect of the present invention provides a method for providing a multi-sided card having a resistive fingerprint array, comprising: providing a set of imaging pixel electrodes for creating a fingerprint scanning surface; providing a voltage source coupled to the set of imaging pixel electrodes for supplying a first voltage to a plurality of imaging pixel electrodes for a controlled duration and supplying a second voltage to the plurality of imaging pixel electrodes for a controlled duration; providing a meter coupled to the set of imaging pixel electrodes for taking a first electrical measurement relating to the first voltage for the plurality of imaging pixel electrodes and taking a second electrical measurement relating to the second voltage for the plurality of imaging pixel electrodes; and providing a controller coupled to the meter for calculating the voltage level difference between the first and second electrical measurements.

BRIEF DESCRIPTION OF THE DRAWINGS

These and other features of this invention will be more readily understood from the following detailed description of the various aspects of the invention taken in conjunction with the accompanying drawings in which.

Figure 1:
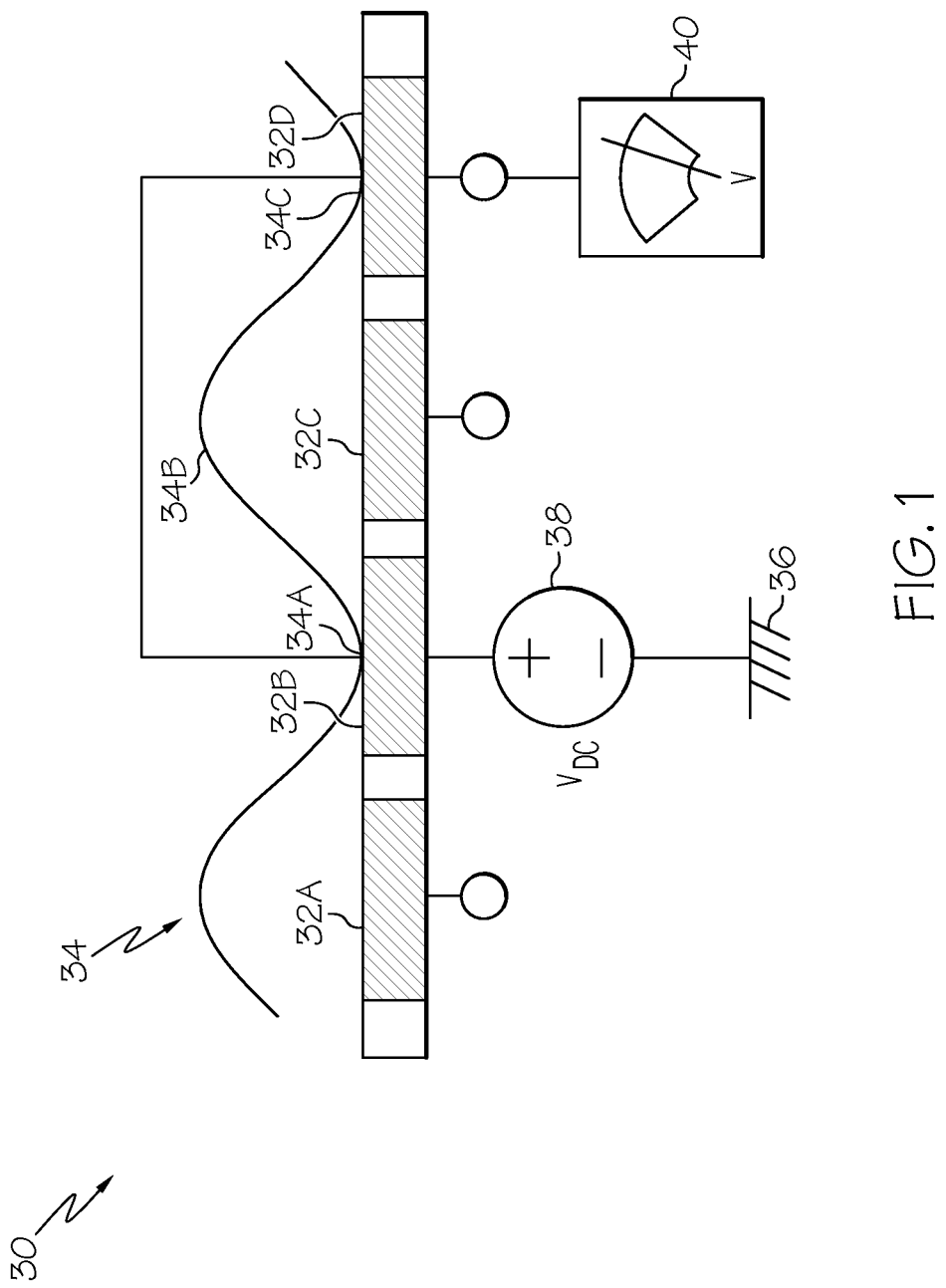
FIG. 1 depicts a fingerprint scanning device according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or rectify "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

A biometric finger scanner is a device that scans a fingerprint and keeps a record of it. For example, when a door is closed or a computer is shut down, a scanning device can be used to open the door or turn the device back on. A person whose fingerprint is stored as a valid access key is scanned when they put their finger on the scanning device. If it matches one of the "approved" fingerprints, access is granted.

The benefits of a biometric finger scanner revolve around the fact that it is nearly impossible to duplicate another person's fingerprint in a form that the scanner will recognize. Other types of access control solutions have a weakness in that they depend on something that can easily be lost, shared, or duplicated. Another strength in fingerprint recognition is that, in the case of providing access through a door, whoever has an approved fingerprint does not necessarily have access to any other part of the security system. Anyone with the key to any door has access to a wealth of information (e.g., the manufacturer of the lock and possibly the model, the type of keys used at the facility, and, in the worst case scenario, possible access to a master-level key that can open more than one door).

In general, fingerprint scans convert people's fingerprints into digital codes or numerical data that can be recorded in a database. Like facial recognition software, fingerprint scanning matches an individual's code against an existing database of codes in order to confirm that individual's identity. Proponents of fingerprint scanning point to the conversion of fingerprints into digital data as a privacy protection measure. Since replicas of fingerprints themselves are never saved, but always converted, fingerprint data cannot be stolen or mishandled.

As indicated above, embodiments of the present invention provide an adaptive and intelligent fingerprint scanning device and approach that provides accurate and energy-efficient fingerprint scanning. Specifically, the present invention relates to a multi-sided fingerprint scanning device on a card (e.g., credit card, smart card, etc.), an associated energy-efficient method for attaining accurate fingerprint information using a multiple charge-coupled biometric sensor array. In a typical embodiment, a scanning device will be provided that includes a scanning area comprised of a set (e.g., at least one) of imaging pixel electrodes (e.g., arranged adjacent to one another in a grid-like or other fashion). As a user presses his/her finger against the scanning area, a first portion of the finger will contact a first electrode while a second portion of the finger will contact a second electrode. When this occurs, a voltage source of the device will apply a first voltage to the first electrode. A voltage source of the device will apply a second voltage to the second electrode. A meter of the device will take a first electrical measurement (e.g., resistance and/or charged skin voltage) of the first electrode and a second electrical measurement of the second electrode. The electrical measurement includes the voltage level of each related pixel measured after the voltage is applied (force mode). The voltage level is a function of wire capacitance, resistance, and electrode capacitance. The voltage level difference between the first electrical measurement and second electrical measurement is calculated. The voltage level difference provides accurate fingerprint information. This technology can be incorporated into a card (e.g., a credit card, debit card, smart card, etc.) for fraud prevention purposes.

Referring now to FIG. 1, a fingerprint scanning device 30 according to an embodiment of the present invention is shown. As depicted, device 30 comprises a set of imaging pixel electrodes/ports/sensors 32A-D for creating a scanning surface, a voltage source 38 coupled to imaging pixel electrode 32B and a meter 40 coupled to imaging pixel electrode 32D. Device 30 can further include a ground 36 coupled to imaging pixel electrode 32B and/or voltage source 38.

In a typical embodiment, voltage source 38 will apply a first voltage (e.g., a low voltage DC bias) to imaging pixel electrode 32B. As shown, imaging pixel electrode 32B is in contact with a first portion 34A of a finger 34. The charged skin voltage (first electrical measurement) across imaging pixel electrode 32B will be measured in response to the applying of the first voltage. Then, the voltage source 38 will apply a second voltage to imaging pixel electrode 32D. The charged skin voltage (second electrical measurement) across imaging pixel electrode 32D will be measured in response to the applying of the second voltage. The voltage level difference between the first electrical measurement and second electrical measurement is calculated. The voltage level difference provides accurate fingerprint information.

Figure 2:
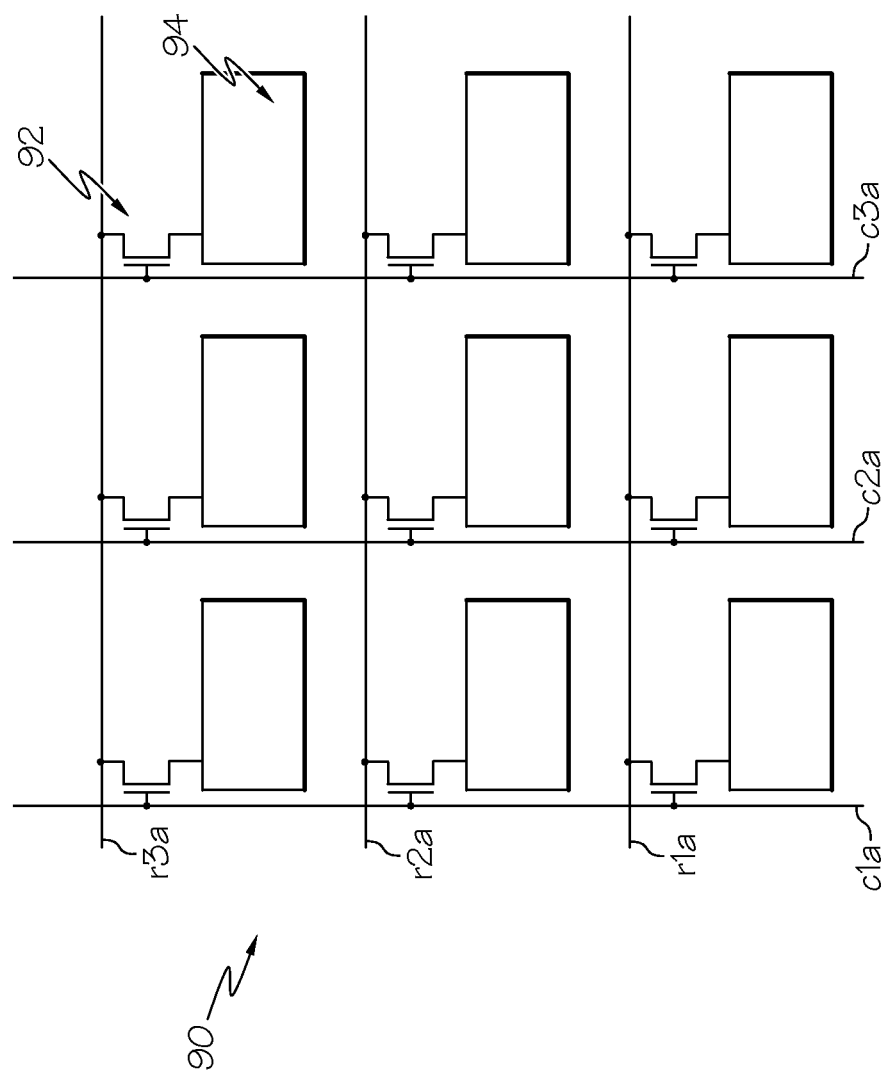
FIG. 2 depicts an electrical sensing array according to an embodiment of the present invention.

Referring now to FIG. 2, an electrical sensing array 90 according to an embodiment of the present invention is shown. As shown, array 90 comprises electrode sensing nodes (e.g., electrode to skin 94). In general, each electric sensing node can be accessed by an independent electrical access (e.g., electronic switch 92).

Figure 3:
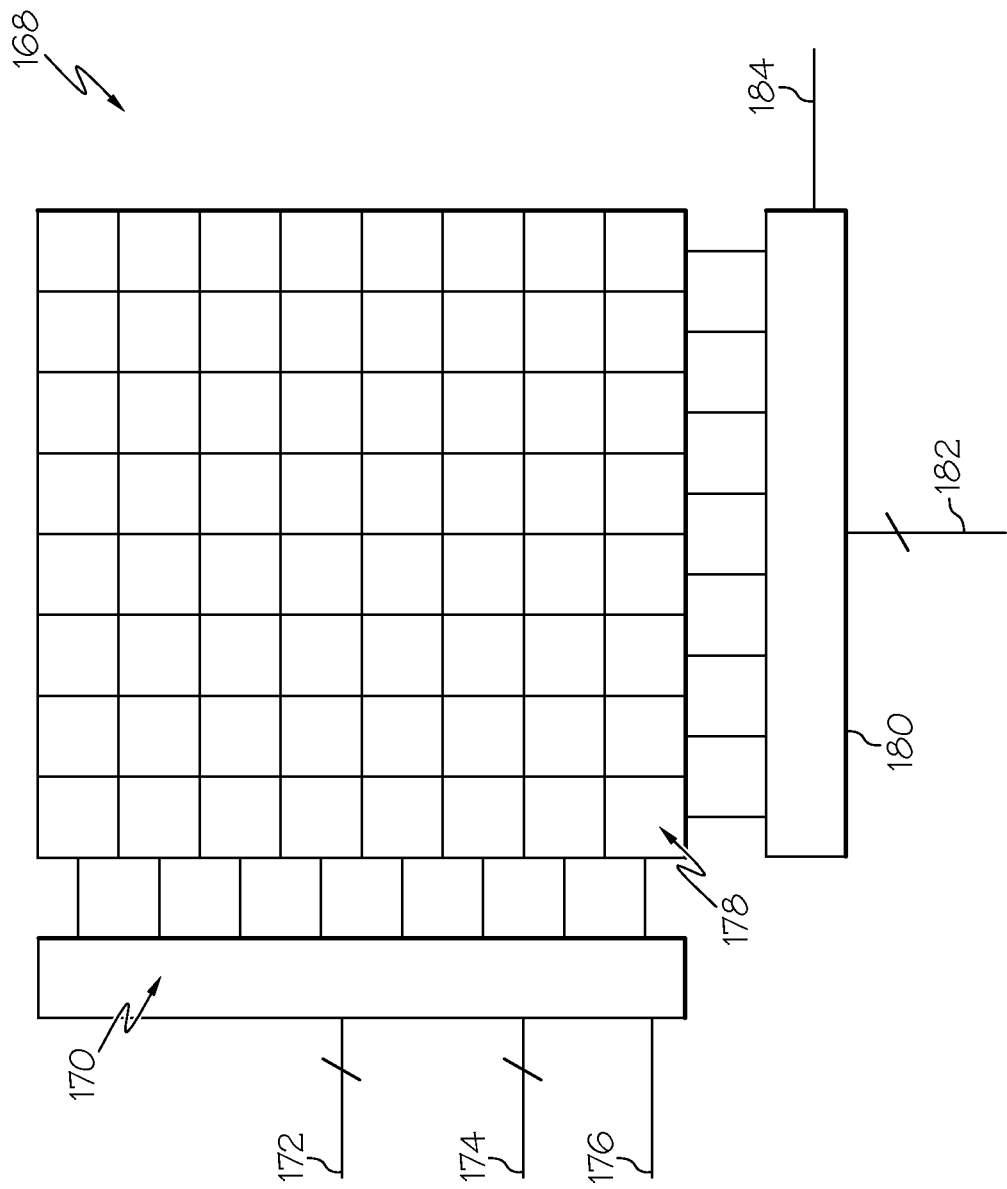
FIG. 3 depicts an electrode array formation diagram according to an embodiment of the present invention.

FIG. 3 depicts an electrode array formation diagram according to an embodiment of the present invention. Electrode array 168 is coupled to sensor input/output (I/O) 174. Sensor I/O 174 provides a communication link to the array. Electrode 178 is highlighted. Electrode array 168 is coupled to row address decoder 170 and column address decoder 180. Address decoders allow direct addressing of rows and columns. In electrode array 168, the electrode enabled is determined by row address 172 and column address 182. As an initialization, the inputs for electrode potential equalization are set to 'enable all' (176, 184).

Figure 4:
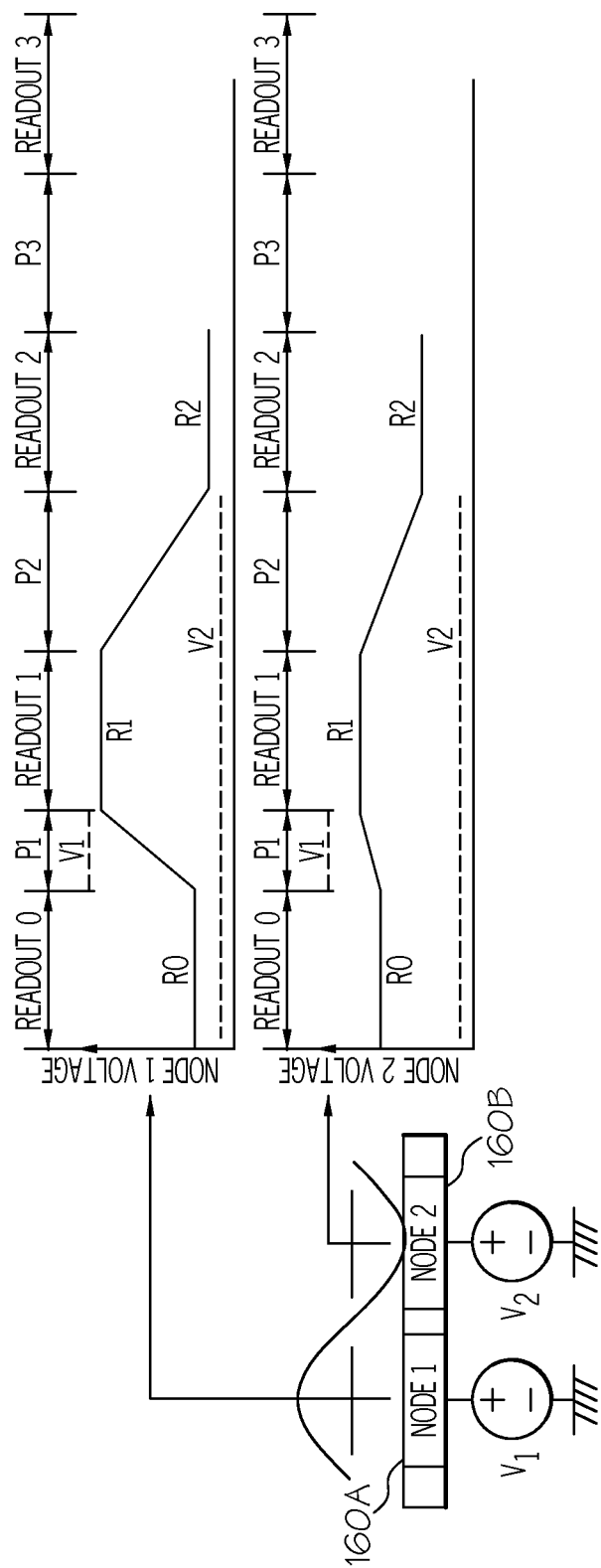
FIG. 4 depicts two nodes being measured simultaneously according to an embodiment of the present invention.

FIG. 4 depicts two nodes being measured simultaneously according to an embodiment of the present invention. Node 1 160A and node 2 160B are measured simultaneously, although it is not necessary for the two to be measured simultaneously. A first voltage (V1s) is applied to node 1 160A and node 2 160B for a controlled duration (P1). The first voltage is cut off. Readout1 collects node 1 160A and node 2 160B voltages. A second voltage (V2s) is applied to node 1 160A and node 2 160B for a controlled duration (P2). The second voltage is cut off. Readout2 collects node 1 160A voltage and node 2 160B voltages. The node voltage difference between readout1 and readout2 generates finger capacitance. A fingerprint ridge would yield a high capacitance, yet a fingerprint valley would yield a low capacitance. The values may also be different depending on the finger condition. There can be multiple iterations with different voltage levels and durations. The voltages may be applied to any number of nodes within the array, from one to all electrodes.

Figure 5:
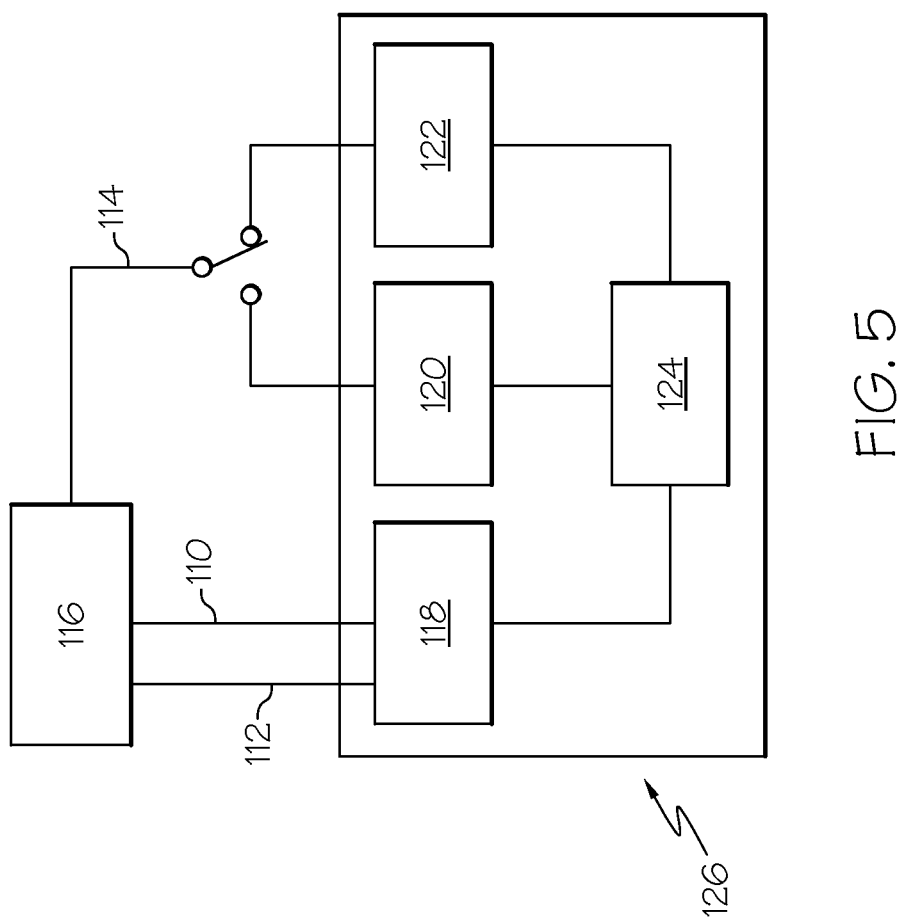
FIG. 5 depicts sensor array control according to one embodiment of the present invention.

FIG. 5 depicts sensor array control according to one embodiment of the present invention. Controller 126 includes sensor controller 118, analog-to-digital converter (ADC) 120, voltage or current source 122, and central processing unit (CPU) 124. Sensor controller 126 is coupled to electrode array 116. Row address 112 and column address 110 determine the electrode selected within electrode array 116. Sensor I/O 114 is a communication link between voltage or current source 122 and electrode array 116.

Figure 6:
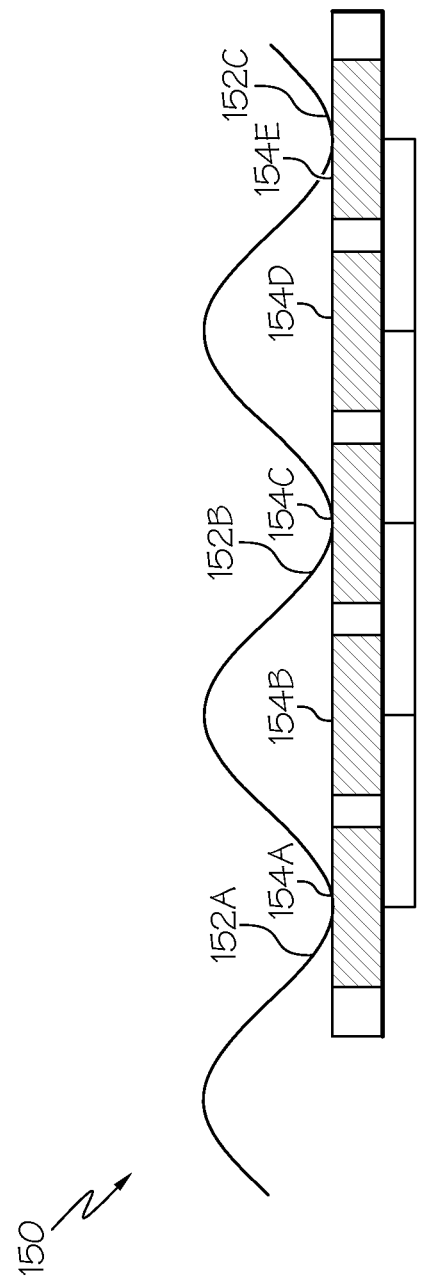
FIG. 6 depicts an initialization step according to an embodiment of the present invention.

FIG. 6 depicts an initialization step according to an embodiment of the present invention. In initialization step 150, all nodes (154A-E) are connected together without independent power source. All node voltages 152A-C converge to the finger's electric potential. The charging and coupling cycles can be reduced with initialization step 150. Initialization step 150 can be repeated between current readout and following a force cycle.

Figure 7A:
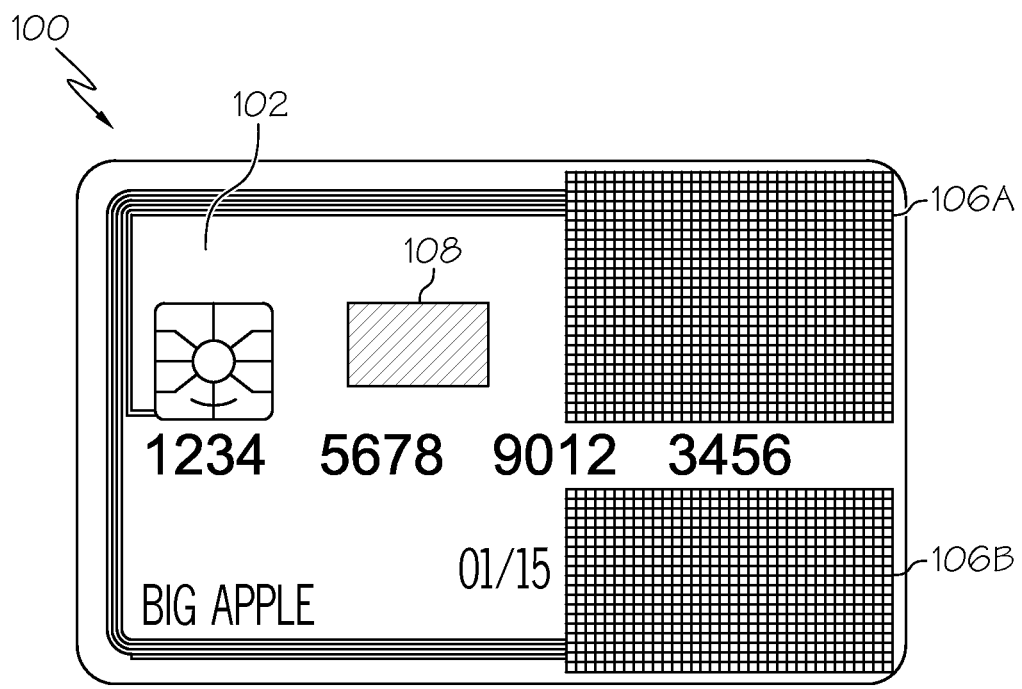
FIG. 7A depicts a front side of a card incorporating the above-referenced teachings.
Figure 7B:
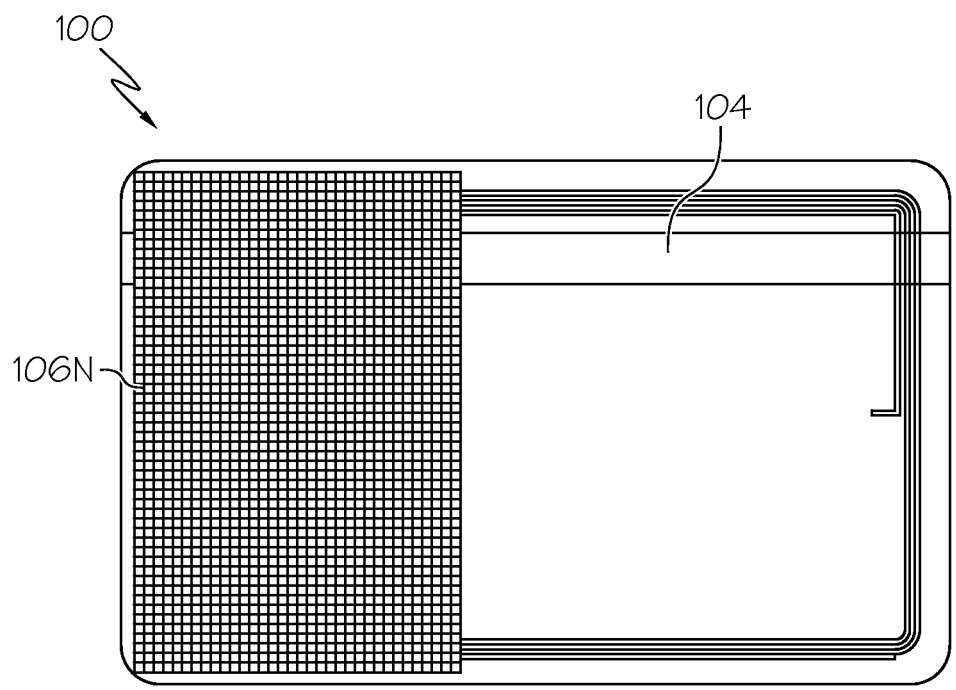
FIG. 7B depicts a back side of the card depicted in FIG. 7A.

Referring now to FIG. 7, a card 100 incorporating the above-referenced teachings is shown. Card 100 can be any type of card such as a debit, credit card, smart card, etc. In a typical embodiment, card 100 is used pursuant to a commercial transaction. As depicted, card 100 comprises a front side 102 and a back side 104, each of which can include biometric/fingerprint scanning devices 106A-N. In general, devices 106A-N can comprise any of the embodiments discussed above such as fingerprint scanning device 30 of FIG. 1, or any combination thereof. Along these lines, devices 106A-N can function as discussed above in conjunction with FIGS. 1-9. Regardless, devices 106A-N can be positioned to capture any card-gripping techniques users may employ. Once a fingerprint is scanned, it can be compared to the authorized user(s) of card 100 to validate any impending usage. Such fingerprints can be stored on a memory medium 108 within card 100, or stored on a server or the like with which communication is held pursuant to a commercial transaction. Once a fingerprint is validated, a commercial transaction can be authorized. In another embodiment, devices 106A-N could also record the positioning of the fingers and compare the same to the historical gripping techniques (e.g., as stored on a memory medium and/or on a server) the authorized user(s) previously employed. It is understood that this can be applied to any multi-sided device (not only two-sided devices).

Figure 8:
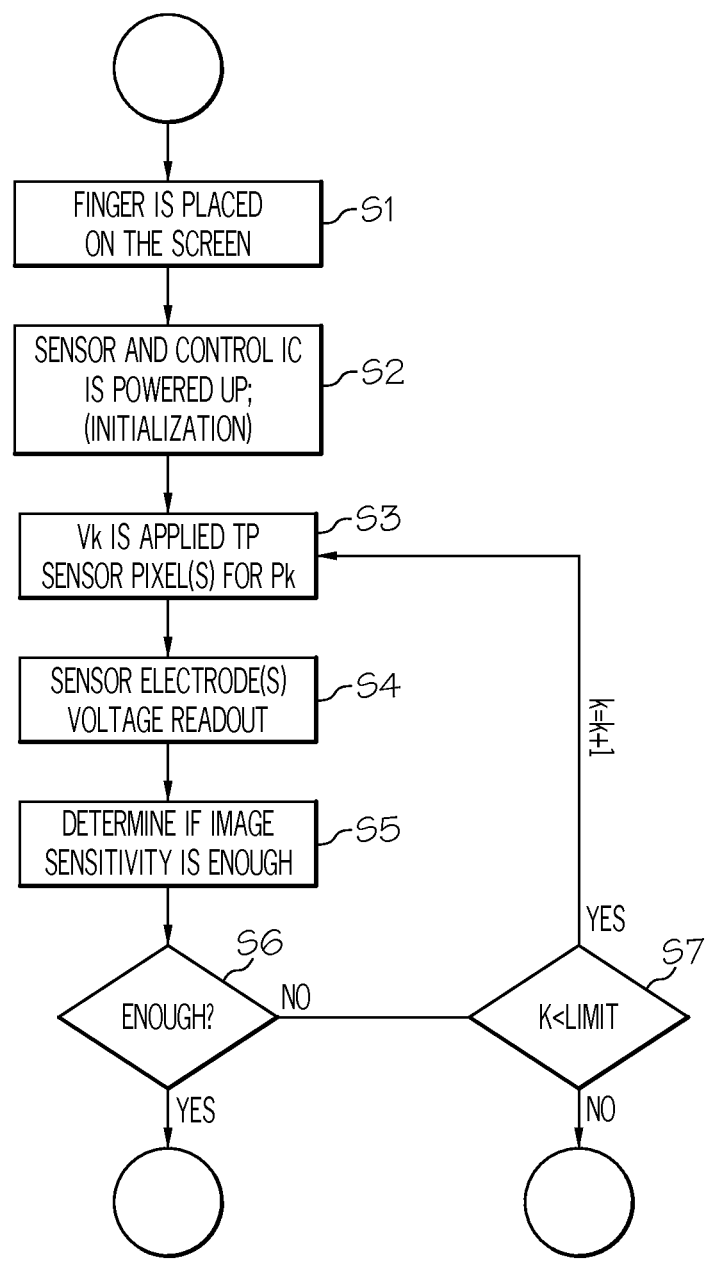
FIG. 8 depicts a multiple charge-coupling flow diagram according to an embodiment of the present invention.

FIG. 8 depicts a multiple charge-coupling flow diagram according to an embodiment of the present invention. In step S1, a finger is placed on the screen. In step S2, the sensor and control integrated circuit (IC) is powered up (i.e., initialization). In step S3, voltage is applied to sensor pixel(s) for voltage level. In step S4, the voltage readout of sensor electrode(s) is done. In steps S5 and S6, a determination is made whether image sensitivity is adequate. If yes, then the process ends. If no, then at step S7 a determination is made as to whether K is less than a limit. If yes, then the process returns to step S3. If no, then the process ends.

Figure 9:
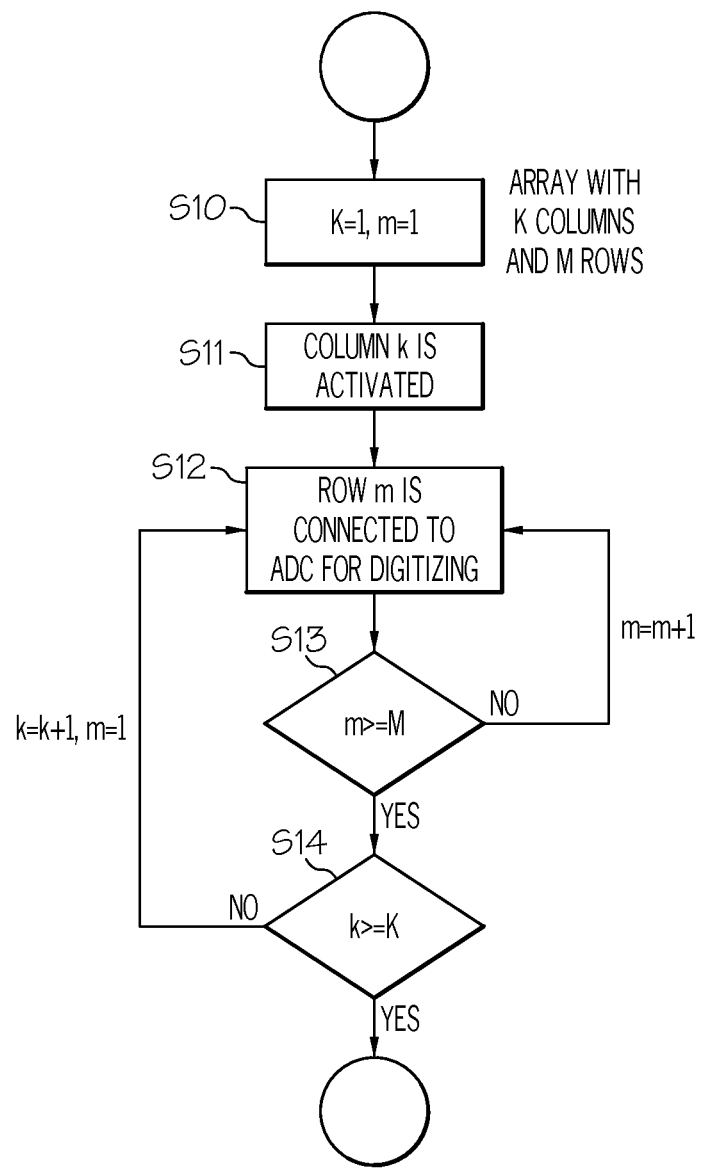
FIG. 9 depicts a sensor array scanning flow diagram according to an embodiment of the present invention.

FIG. 9 depicts a sensor array scanning flow diagram according to an embodiment of the present invention. An electrode array having K columns and M rows is assumed. In step S10, K and m are set to 1. In step S11, column K is activated. In step S12, row M is connected to an ADC for digitizing. In step S13, a comparison is done. If the current row is not the last row of the array, then move to the next row and return to step S12. If it is the last row of the array, then check to determine whether all columns have been processed in step S14. If all columns have not been processed, then set the row counter to 1, move to the next column, and return to step S12. The process ends when all rows and columns have been accounted for.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A multi-sided card having a resistive fingerprint array, comprising:

a first side having a first fingerprint scanning device;

a second side having a second fingerprint scanning device, the first fingerprint scanning device and the second fingerprint scanning device each comprising:

a set of imaging pixel electrodes for creating a fingerprint scanning surface;

a voltage source coupled to the set of imaging pixel electrodes for supplying a first voltage to a plurality of imaging pixel electrodes for a controlled duration and supplying a second voltage to the plurality of imaging pixel electrodes for a controlled duration;

a meter coupled to the set of imaging pixel electrodes for taking a first electrical measurement relating to the first voltage for the plurality of imaging pixel electrodes and taking a second electrical measurement relating to the second voltage for the plurality of imaging pixel electrodes;

a controller coupled to the meter for calculating the voltage level difference between the first electrical measurement and the second electrical measurement;

a memory medium for storing historical data relating to finger position on the fingerprint scanning surface; and a comparator for comparing a position of a scanned fingerprint to the historical data.

2. The multi-sided card of claim 1, the first electrical measurement comprising a resistance that is taken by the meter in response to the applying of the first voltage to the plurality of imaging pixel electrodes.

3. The multi-sided card of claim 1, the second electrical measurement comprising a resistance that is taken by the meter in response to the applying of the second voltage to the plurality of imaging pixel electrodes.

4. The multi-sided card of claim 1, the voltage source and the meter being coupled to the imaging pixel electrode.

5. The multi-sided card of claim 1, the first electrical measurement comprising a charged skin voltage that is taken by the meter in response to the applying of the first voltage to the plurality of imaging pixel electrodes.

6. The multi-sided card of claim 1, the second electrical measurement comprising a charged skin voltage that is taken by the meter in response to the applying of the second voltage to the plurality of imaging pixel electrodes.

7. The multi-sided card of claim 1, at least two of the imaging pixel ports being non-adjacent to one another among the plurality of imaging pixel ports.

8. A method of scanning fingerprints on a multi-sided card, comprising:

applying a first voltage to an imaging pixel electrode, the imaging pixel electrode being in contact with a finger positioned on the multi-sided card;

determining a first electrical measurement across the imaging pixel electrode;

applying a second voltage to the imaging pixel electrode;

determining a second electrical measurement across the imaging pixel electrode;

calculating the voltage level difference between the first electrical measurement and the second electrical measurement; and comparing a position of the finger on the fingerprint scanning surface to historical data relating to finger position on the fingerprint scanning surface.

9. The method of claim 8, the determining of a first electrical measurement comprising determining a resistance in response to the applying of the first voltage to the imaging pixel electrode.

10. The method of claim 8, the determining of a second electrical measurement comprising determining a resistance in response to the applying of the second voltage to the imaging pixel electrode.

11. The method of claim 8, the first voltage being applied via a voltage source coupled to the imaging pixel electrode, and the resistance being determined via a meter coupled to the imaging pixel electrode.

12. The method of claim 8, the determining of a first electrical measurement comprising determining a charged skin voltage in response to the applying of the first voltage to the imaging pixel electrode.

13. The method of claim 8, the determining of a second electrical measurement comprising determining a charged skin voltage in response to the applying of the second voltage to the imaging pixel electrode.

14. The method of claim 8, the imaging pixel electrode being among a plurality of imaging pixel ports of a device for carrying out the method.

15. A method for providing a multi-sided card having a resistive fingerprint array, comprising:

providing a set of imaging pixel electrodes for creating a fingerprint scanning surface;

providing a voltage source coupled to the set of imaging pixel electrodes for supplying a first voltage to a plurality of imaging pixel electrodes for a controlled duration and supplying a second voltage to the plurality of imaging pixel electrodes for a controlled duration;

providing a meter coupled to the set of imaging pixel electrodes for taking a first electrical measurement relating to the first voltage for the plurality of imaging pixel electrodes and taking a second electrical measurement relating to the second voltage for the plurality of imaging pixel electrodes;

providing a controller coupled to the meter for calculating the voltage level difference between the first electrical measurement and the second electrical measurement;

providing a memory medium for storing historical data relating to finger position on the fingerprint scanning surface; and providing a comparator for comparing a position of a scanned fingerprint to the historical data.

16. The method of claim 15, the first electrical measurement comprising a resistance that is taken by the meter in response to the applying of the first voltage to the plurality of imaging pixel electrodes.

17. The method of claim 15, the second electrical measurement comprising a resistance that is taken by the meter in response to the applying of the second voltage to the plurality of imaging pixel electrodes.

18. The method of claim 15, the voltage source and the meter being coupled to the imaging pixel electrode.

19. The method of claim 15, the first electrical measurement comprising a charged skin voltage that is taken by the meter in response to the applying of the first voltage to the plurality of imaging pixel electrodes.

20. The method of claim 15, the second electrical measurement comprising a charged skin voltage that is taken by the meter in response to the applying of the second voltage to the plurality of imaging pixel electrodes.

* * * * *